Feb. 20, 1962  H. J. HORVITZ  3,021,613
COLORED MORTAR DISPLAY
Filed Jan. 5, 1961
FIG. 1
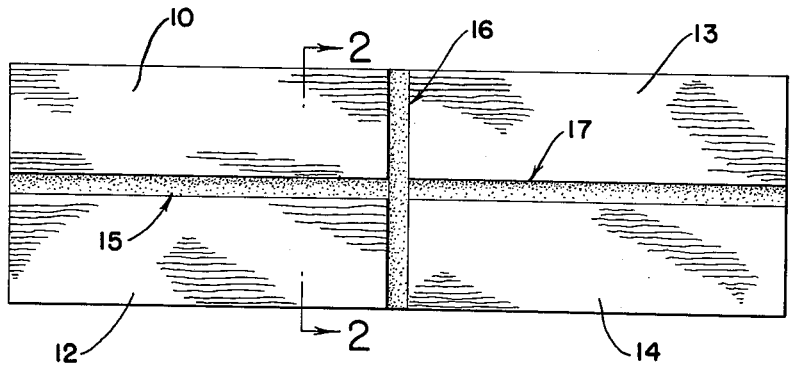
FIG. 2
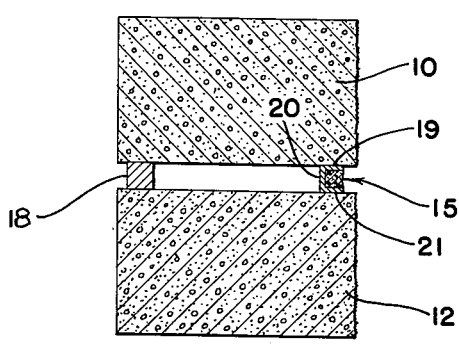
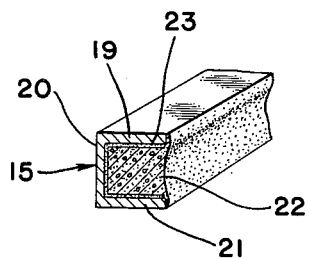
FIG. 3
INVENTOR.
HOWARD J. HORVITZ
BY
*Fay & Fay*
ATTORNEYS

United States Patent Office 3,021,613
Patented Feb. 20, 1962

3,021,613
COLORED MORTAR DISPLAY
Howard J. Horvitz, Shaker Heights, Ohio, assignor to Pre-Mix Corporation, Cleveland, Ohio, a corporation of Ohio
Filed Jan. 5, 1961, Ser. No. 80,825
2 Claims. (Cl. 35—16)

This invention relating as indicated to a colored mortar display is particularly directed to a technique for displaying colored mortars and bricks, marble, tile, limestone and cement to simulate a wall and give the correct impression of color of the mortar in a display of colored bricks, marble, tile, limestone and cement.

In general, in connection with these building material industries, the sale of bricks and the like has taken on a great number of colors and these are not infrequently shown in connection with various glazes which might come in quite a number of colors. These are now being sold in connection with colored mortars wherein the mortar comes colored and is mixed on the site for construction into a building and this produces a solid color effect which may have a pleasing or striking appearance on the design of the building. In connection with the serious approach to architects, engineers, contractors, builders and the owners of these buildings, it is necessary to provide a display which will give them the true color and the impression of the bricks and colored mortar so that they may accurately register their choices, i.e., they may select properly their choice of colors. This is done by submitting a sample display of popular shades to show the architect and then with a specific project in mind, a sample may be submitted in the form of a briquette or ⅜" slabs for insertion between the masonry units in varying shades as necessary until a satisfactory comparison has been found. The sample would frequently be done with the particular sand that is available to the contractor for the job in question so that the color comparison can be as accurate as possible.

Since the mortar itself is quite fragile when put together in very thin sections, it is hard to build a display which will have any permanence for use to assemble and disassemble in connection with bricks. This invention then is directed to a colored mortar display and a method of showing a simulated wall of colored mortar and bricks. The invention is particularly directed to a colored mortar strip involving a channel-shaped member having set therein and laid between a set of bricks both in the horizontal and vertical plane by means of these pencil-like strips to create the exact impression of the color and how the bricks will appear. A spacer strip is used on the rear portion which is in the same thickness of the mortar to be used in the assembled wall.

This invention then relates to a combination of colored bricks and the like having in the space therebetween a colored mortar strip involving a colored mortar which is cemented in place in a channel member which is positioned between the bricks to create the accurate image of the bricks with the colored mortar therebetween.

The object of this invention is to create a new technique for displaying colored mortars for easy assembly to a customer to show in a visual manner an impression created by the use of colored bricks and colored mortars. The object of this invention is to provide a technique for easy displaying colored mortar in a display of colored bricks. Further object of this invention is to develop a strip, a colored mortar strip, in order to display the various shades and tints of colored mortars so that these may be readily handled without breakage and will show without contaminants the correct color of the mortar.

To the accomplishment of the foregoing and related ends, said invention, then, consists of the means herein-after fully described and particularly pointed out in the claims; the following description setting forth in detail one approved means of carrying out the invention, such disclosed means, however, constituting but one of the various ways in which the principles of the invention may be used.

In the drawings:

FIG. 1 shows a colored mortar and brick display;

FIG. 2 shows a cross-section along the line 2—2 of FIG. 1 showing the colored mortar strip, cross-section of the brick and the spacer block; and FIG. 3 shows an enlarged cross-section of the colored mortar strip.

In the drawings, 10 shows a brick which might have a special glaze or tint thereon of any color, perhaps red, yellow or blue and 12, 13, and 14 show a brick display involving side and end views of same in pattern arrangements which are well-known in the art; 15 shows a colored mortar display strip shown more particularly in connection with FIG. 2; and 16 shows a vertical colored mortar display strip used between the bricks; 17 shows a further strip of the manner which will be mounted between the bricks of this colored mortar display in connection with FIG. 2 and shows a cross-section of the view involving a lower brick 12 and an upper brick 10, colored mortar display unit 15, a spacer block 18 which is of the same vertical thickness as the colored mortar display unit 15. This colored mortar display unit would be the section of the mortar used for the colored mortar which would be mixed with the appropriate amount of water and sand and placed in a channel member which is generally an aluminum, plastic or equivalent material resistant to the corrosion of the mortar having a side 19 and 20 and a further side 21 and this mortar may be secured as by means of a pre-coating of glue 23 and the like in order that the mortar may securely stick in the channel member.

Of course, it should be understood that the channel member could be roughened by extruding it in a specified shape as by means of a groove or by other means so that the mortar would not slip from the channel member. These channel members would be placed between the bricks as for example channel 15 between the bricks 10 and 12 and it would, as seen in connection with FIG. 1, give the impression of the mortar and its actual color so that it could be compared.

It is a valuable aid to the selector of mortars to get an impression of what the mortars can look like between some glazed bricks and the like. Frequently, the brick salesmen and the mortar salesmen must go to a lot of trouble to produce a composite mixture to show the exact tint and there can be quite a number of tints that will be used in connection with bricks and the like. He may choose the identical color or some contrasting color and it can be in such a wide range that it presents problems for display.

This is a simple unit whereby a person may display by means of a simple choice of three or four of the colored bricks and by adding the appropriate sections of the colored mortar channel members between the bricks and give the correct visual impression. Mortar member is not contaminated by means of a special resin which would artificially color the mortar and give the wrong impression but is the actual mortar used and fitted within a special channel because the mortar itself in such thin strips and sections is quite weak and fragile and though cast as a pencil, may be easily broken and does not serve its function very long. This invention then will answer to colored mortar display and to the components making up the display.

This invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A colored mortar display comprising a plurality of colored building materials in adjacent relationship in which at least one face of these building materials is in the same plane and a colored simulated mortar display unit therebetween, said colored simulated mortar display unit comprising a channel member which is the exact thickness of the mortar between these building materials; said channel having colored simulated mortar secured therein filling the channel, whereby a visual impression is created of the colored mortar in the relationship to the building materials.

2. A colored simulated mortar display unit comprising a plurality of building materials spaced relative to one another, the spacing between said building materials being done by means of a colored simulated mortar strip, at least the strip facing the viewer in the display consisting of a channel-shaped member substantially of rectangular form filled with a colored simulated mortar to full depth of the channel; said outer surface of the mortar being substantially in the same plane with the other surfaces of the building materials.

References Cited in the file of this patent

UNITED STATES PATENTS

| | | |
|---|---|---|
| 1,471,437 | Wood | Oct. 23, 1923 |
| 1,478,425 | Dickinson | Dec. 25, 1923 |
| 1,619,435 | Rettig | Mar. 1, 1927 |
| 1,656,199 | Hodgson | Jan. 17, 1928 |